Nov. 17, 1970        J. A. JOSLYN ET AL        3,541,426
CROSSFIRE PROTECTION TECHNIQUE
Filed Aug. 1, 1968

INVENTORS
JOHN A. JOSLYN
ALBERT F. KOCH

United States Patent Office 3,541,426
Patented Nov. 17, 1970

3,541,426
CROSSFIRE PROTECTION TECHNIQUE
John A. Joslyn, Dalton, and Albert F. Koch, Lanesboro, Mass., assignors to General Electric Company, a corporation of New York
Filed Aug. 1, 1968, Ser. No. 749,438
Int. Cl. H02m 7/78; H02p 1/22
U.S. Cl. 321—5         7 Claims

ABSTRACT OF THE DISCLOSURE

A control system for a DC motor operated via controllable rectifiers from a multiphase AC source. Controllable rectifiers, such as SCR's, are poled in both directions in order to achieve bidirectional operation. The input or "order" signal is monitored by an amplifier and a Schmitt trigger, the Schmitt trigger assuming one state for positive order signals and the other state for negative order signals. The two outputs of the Schmitt trigger are connected to the positive and negative firing circuits which control the SCR's so as to inhibit their operation and thereby "lock out" one or the other set of firing circuits, preventing crossfire. The technique of "hardening," an advance of the firing angle to more nearly linearize system output, is explained and its relation to crossfire, which is obviated by the invention, is shown.

BACKGROUND OF THE INVENTION

This invention relates to motor control systems. More specifically, the invention relates to a system of motor control utilizing controllable rectifiers whereby "crossfire" between rectifiers is prevented.

Systems of motor control utilizing controllable rectifiers are well known. Such systems have become increasingly popular with the advent of solid state controllable rectifiers referred to broadly as thyrectors.

The controllable rectifiers in such systems are arranged so as to control the flow of current from the power source to the motor being controlled. In order to have bidirectional capabilities it is necessary to provide rectifiers which are "poled" for conducting current in one direction and additional rectifiers "poled" to conduct in the opposite direction. However, when this bidirectional capability is provided, the controllable rectifiers are connected in such a fashion that conduction of certain combinations may inadvertently result in a short circuit across the power source. Such as a short circuit is referred to as a "crossfire."

In systems where the power source is multiple phase AC, the motor speed and direction is controlled by sequentially firing the controllable rectifiers. Ordinarily, rectifiers poled in one direction only are fired. However, in certain systems, it has been found to be desirable to apply a predetermined phase advance in the firing angle in both polarities. This practice, referred to as "hardening," will be explained in detail later. For the present, it suffices to say that hardening accentuates the probability of crossfire at a particular firing angle. Crossfire is particularly undesirable under these conditions because it makes it impossible to command certain motor speeds under certain operating conditions, thereby substantially reducing the effectiveness of a system which utilizes hardening.

While some prior art systems have made provision for the prevention of crossfire, they have done so only on an "after-the-fact" basis. That is, prior art systems have sensed the current through, or voltage across, the load and locked out oppositely poled rectifiers. Such systems do not, however, prevent crossfire in systems using "hardening" since it is necessary to detect the polarity of the input, rather than the output, signal.

SUMMARY OF THE INVENTION

It is an object of the present invention to prevent crossfire between controllable rectifiers in a motor control system on a "before-the-fact" basis.

It is a further object of the present invention to prevent crossfire in systems which utilize an AC power source and at the same time retain "hardening."

It is a still further object to prevent crossfire so as to prevent damage to system components and to avoid unnecessary interruptions in system operation.

In accordance with the present invention, an input signal, indicative of desired motor torque, is sensed. The operation of the controllable rectifiers poled so as to produce torque in the oposite direction is inhibited in response to this sensing.

DESCRIPTION OF THE DRAWINGS

While the specifications concludes with claims particularly pointing out the invention in its broader aspects, the specification and attached drawings will describe a particular embodiment of the invention.

DESCRIPTION OF THE PREFERRED EMBODIMENT

Figure 1:
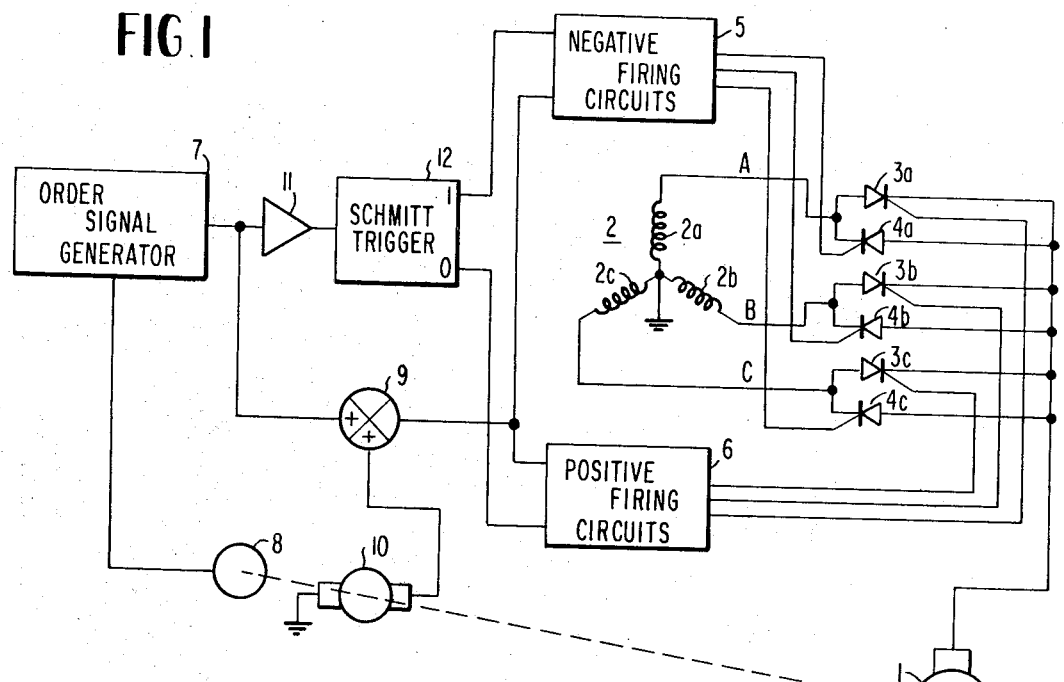
FIG. 1 is a block diagram of a preferred embodiment of the invention.

Turning now to FIG. 1, there is shown a load such as DC motor 1 which receives power from a source such as the multiphase AC source indicated by the transformer secondary 2. Power is transmitted from the AC source 2 to the motor 1 by way of controllable rectifiers 3a–c and 4a–c. In the present embodiment, the controllable rectifiers 3a–c and 4a–c are silicon controlled rectifiers (SCR). SCR's 3a–c are poled so as to conduct current causing torque in the positive direction while SCR's 4a–c are poled in the negative direction. Hence, it can be seen that by proper selection of SCR's and by controlling the time at which gate pulses are transmitted to these SCR's both the direction and speed of motor 1 can be controlled.

In order to control the firing of the SCR's, there is provided initiating means such as the firing circuits 5 and 6. The firing circuits 5 and 6 can be of any type well known in the art which generates firing pulses in accordance with an input signal indicative of the desired rotation of a motor 1.

The system shown in FIG. 1 may be used, for example, to control the position of the turret of an automatic weapon. In such an application, the desired position of the turret may be indicated by some type of digital or phase varying signal. However, the present invention is not limited to such a system and the means for generating the input signal is indicated generally by the order signal generator 7. The order signal generator 7 may first generate a command signal indicative of the desired position of the motor being controlled. This signal is compared with the feedback signal from some type of feedback device 8 which generates a feedback signal compatible with the command signal. If the command signal was a phase-modulated wave then the feedback device 8 might comprise a selsyn. The error between the command and feedback signals is then conditioned and forms the output of the order signal generator 7. This signal, whose magnitude and polarity are indicative of the desired motor torque, forms the input to the motor control system. The output of the order signal generator 7 is, in conventional systems, fed to a summing point 9 for comparison with the output of a DC tachometer 10 which generates positive feedback as indicated by the symbols in the summing point 9. Conventionally, the output of the summing point 9 forms the input to the negative firing circuits 5 and the positive firing circuits 6 which then control the conduction of the SCR's 3a–c and 4a–c in order to generate the desired motor torque.

In the conventional system described thus far, crossfires may result which short out the power source. For example, if SCR's 3a and 4b were simultaneously triggered the AC waveforms are such that, as shall be seen in detail hereinafter, the multiphase power source 2 would be short circuited from transformer winding 2a through SCR's 3a and 4b to transformer winding 2b. The result of this crossfire is to divert current from the motor 1.

In order to avoid the undesirable crossfire, there is provided an amplifier 11 which acts to amplify the order signal received from the order signal generator 7 and thereby increase the sensitivity of the system. The output of the amplifier 11 forms the input to a Schmitt trigger 12. Schmitt triggers are well known in the art and may be found, for example, in the GE Transistor Manual, 7th ed., p. 200. As is well known, a Schmitt trigger is a voltage sensitive bistable device whose output assumes one state when its input voltage is above a certain level in one polarity. By proper choice of components, the Schmitt trigger 12 can be arranged so as to assume one state for an order signal of positive polarity and assume the opposite state for order signals of negative polarity. The outputs of the Schmitt trigger 12 are fed to form additional inputs to the firing circuits 5 and 6 so that when the Schmitt trigger is in one state, one of the firing circuits will be inhibited whereas if the Schmitt trigger is in the opposite state, the other firing circuit will be inhibited.

By way of example, if the output of the order signal generator 7 is positive, positive torque is desired. The positive output of the order signal generator 7 will be amplified by amplifier 11.

The Schmitt trigger 12 is adapted to assume the "set" state whenever its input voltage is positive so that the output marked "1" assumes a voltage level sufficient to inhibit the operation of the negative firing circuits 5. When the Schmitt trigger 12 is "set" the "1" output may be a positive voltage whereas the "0" output will then be a negative voltage so as to permit the operation of the positive firing circuits 6. Under these conditions, only the positively poled SCR's 3a–c can be initiated so that positive torque will be generated by the motor 1 and the possibility of crossfire is eliminated.

On the other hand, if the order signal is a negative voltage, Schmitt trigger 12 will assume its "reset" state. Its "1" output is a negative voltage which permits the operation of the negative firing circuits 5 and therefore the negatively poled SCR's 4a–c can conduct. Since its "0" output will now assume a positive voltage, the positive firing circuits 6 are inhibited and SCR's 3a–c cannot conduct thereby eliminating the possibility of crossfire.

Figure 2A:
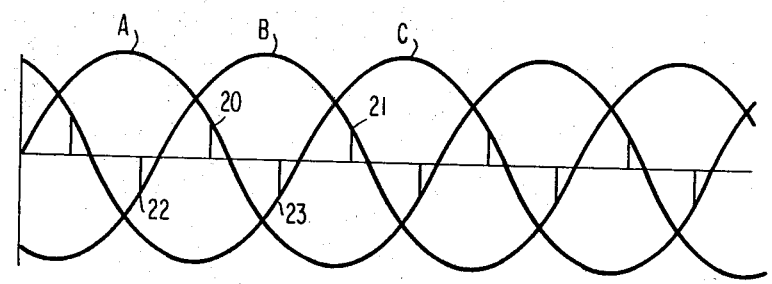
FIG. 2(a) illustrates the operation of the system shown in FIG. 1 with 15° hardening and a zero input signal.
Figure 2B:
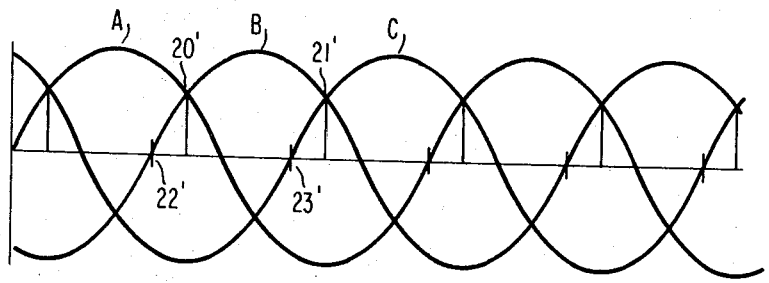
FIG. 2(b) illustrates similar operation with 15° hardening and a 15° input signal.
Figure 2C:
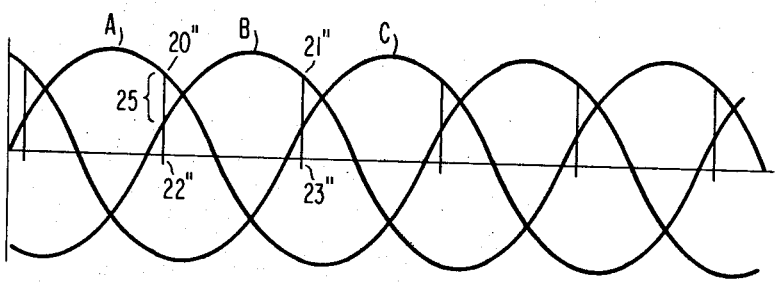
FIG. 2(c) illustrates operation with 15° hardening and a 30° input signal.

Referring now to FIGS. 2(a), 2(b) and 2(c), operation of the sytem described in FIG. 1 will be described in conjunction with the technique of "hardening." As was pointed out above, the technique of "hardening" is utilized in controllable rectifier systems so as to more nearly linearize the power transferred from the source to the load. Since the power source is a time varying AC waveform, it is apparent that the relation between time of firing and power transferred is not linear. However, if the effective firing angle is advanced a predetermined amount, the output of the controllable rectifiers will be more nearly linear. The amount of the predetermined advance is referred to as the "harending."

Referring to FIG. 2(a), there is shown the timed relationship between the three phases, A, B, and C, of a multiple phase AC power source. In order to more nearly linearize the output of a controllable rectifier system which operates from a multiple phase AC system, the firing angle may be advanced by a predetermined amount such as, for example, 15 electrical degrees. FIG. 2(a) shows this predetermined advance by illustrating the timed relationship of the firing pulses during zero error conditions. As shown, the SCR 3a will fire during the last 15 degrees of the positive portion of the A phase in response to the firing pulse indicated at 20. Similarly, the SCR 3b will be fired during the last 15 degrees of the positive half of the B phase by virtue of the firing pulse indicated at 21. The negative SCR's will be fired in a similar fashion so that SCR 4b will be fired during the last 15 degrees of the negative half of B phase as indicated by the firing pulse shown at 22 and SCR 4c will be fired during the last 15 degrees of the negative portion of C phase as indicated by the firing pulse shown at 23.

When an order signal is received, the firing pulses will be advanced or retarded from the positions shown in FIG. 2(a). If the order signal is positive, the firing angle for the positive SCR's will be advanced and the firing angle for the negative SCR's will be retarded. For example, referring to FIG. 2(b), if the order signal is such that the firing angle is to be advanced 15 degrees in the positive direction, the firing pulse for positive SCR 3a will be advanced to the position indicated at 20' in FIG. 2(b). Similarly, the firing pulse for positive SCR 3b will be advanced to the positive shown at 21' in FIG. 2(b). By the same token, the firing pulses for the negative SCR's 4b, 4c will be retarded so as to occur at 22' and 23', respectively. As can be seen from an overall view of FIG. 2(b), the net power transferred from the source to the load will be positive.

If, however, the firing angle of the positive SCR's is to be advanced a total of 30 degrees, it can be seen that both positive and negative SCR's will be triggered simultaneously. This is shown in FIG. 2(c). The firing pulse for positive rectifier 3a is advanced so as to occur at 20". Similarly, the firing pulse for positive SCR 3b is advanced and occurs at 21". However, the negative firing pulse for the B phase has now been retarded by 30 degrees and occurs at 22" which is simultaneous with the firing of the positive rectifier on the A phase. Hence, the result of generating these firing pulses simultaneously is to initiate conduction of SCR's 3a and 4b at the same time. Since SCR 4b is poled in the negative direction, it may not conduct under ordinary circumstances even though it receives a firing pulse. If, however, the voltage across the motor 1 falls somewhere within the level indicated at 25 in FIG. 2(c), both SCR's 3a and 4b will conduct and hence the power source will be short circuited. From the foregoing, it is obvious that a system which uses 15 degrees of hardening cannot be commanded to advance the firing pulse by 30 degrees without the possibility of a crossfire between phases. Similarly, the occurrence of the firing pulse 21" to initiate conduction of SCR 3b occurs simultaneously with the generation of firing pulse 23" which initiates conduction of SCR 4c and hence crossfire is again initiated.

It is obvious that the difficulties ountlined in the foregoing description of FIGS. 2(a), 2(b) and 2(c) are obviated by the system of the present invention without foregoinng the salutory features of ."hardening". When the system of the present invention is provided, the SCR's poled in the direction opposite that desired are inhibited and hence crossfire cannot occur.

Although the invention has been described with respect to a particular embodiment, the principles underlining this invention will suggest many additional modifications of the particular embodiment to those skilled in the art. Therefore, it is intended that the appended claims shall not be limited to the specific embodiments described but rather shall cover all such modifications as fall within the true spirit and scope of the invention.

What is claimed as new and desired to be secured by Letters Patent of the United States is:

1. A control system for controlling the flow of current between a source and a load comprising:
    (a) input means for generating an input signal indicative of the desired level of current to be transmitted between the source and the load;
    (b) a plurality of controllable rectifiers operatively connected between the source and the load, a first group of said controllable rectifiers being poled to transmit current in one direction and a second group of said controllable rectifiers being poled to transmit current in the other direction;
    (c) first initiating means operatively connected to said first group of controllable rectifiers for initiating the conduction of said first group;
    (d) second inititing means operatively connected to said second group of controllable rectifiers for initiating the conduction of said second group;
    (e) feedback means coupled to the load to provide feedback signals indicative of the actual performance of the load;
    (f) means having an input operatively connected to said input means and to said feedback means and having an output operatively connected to said first and second initiating means and responsive to a combination of the input signals and the feedback signals to actuate said first and second initiating means;
    (g) sensing means operatively connected to said input means for sensing the polarity of the input signal and providing sensing signals of a substantially continuous level, said sensing means being operatively connected to said first and second initiating means whereby said first initiating means is inhibited in response to said sensing signals whenever the polarity of the input signal is such that conduction of said second group of controllable rectifiers is required and whereby said second initiating means is inhibited in response to said sensing signals whenever the polarity of the input signal is such that conduction of said first group of controllable rectifiers is required.

2. The control system recited in claim 1 wherein said first and second initiating means comprise first and second firing circuits.

3. The control system recited in claim 2 wherein said sensing means comprises a Schmitt trigger whose outputs are connected to said positive and negative firing circuits whereby a positive voltage at the input of said Schmitt trigger inhibits said first firing circuits and a negative voltage at the input of said Schmitt trigger inhibits said second firing circuits.

4. A control system for transmitting power between a multiphase AC source and a DC motor, the control system responding to an order signal indicative of the polarity and the desired level of current to be transmitted, comprising:
    (a) a plurality of controllable rectifiers connected to each phase of the AC source, said controllable rectifiers being divided into a first group connected to transmit current in one direction and a second group connected to transmit current in the opposite direction;
    (b) first and second initiating means operatively connected to said first and second groups of controllable rectifiers respectively to initiate conduction thereof;
    (c) feedback means coupled to the motor to provide feedback signals indicative of the actual performance of the motor;
    (d) means having an input for receiving the order signal and connected to said feedback means for receiving the feedback signals and having an output operatively connected to said first and second initiating means and responsive to a combination of the input signals and the feedback signals to actuate said first and second initiating means; and
    (e) sensing means for detecting the polarity of the order signal and providing sensing signals of a substantially continuous level, said sensing means connected to said first and second initiating means; means for connecting said sensing means to said first and second initiating means so that said first initiating means are inhibited in response to said sensing signals when the order signal requires conduction of said second group of controllable rectifiers and said second initiating means are inhibited in response to said sensing signals whenever the order signal requires conduction of said first group.

5. The AC to DC control system recited in claim 4 wherein said controllable rectifiers comprise SCR's and said first and second initiating means comprise first and second trigger circuits connected to the gate leads of said SCR's.

6. The AC to DC control system recited in claim 5 wherein said sensing means comprises a bistable device which assumes a first state when its input voltage is greater than a predetermined voltage of one polarity and assumes the opposite state when its input voltage is less than the predetermined voltage.

7. The AC to DC control system recited in claim 6 wherein said sensing means further comprises an amplifier whose input is the order signal and whose output is connected to the input of said bistable device.

References Cited
UNITED STATES PATENTS

| | | | |
|---|---|---|---|
| 3,399,337 | 8/1968 | Stone | 321—5 |
| 3,453,523 | 7/1969 | Fair et al. | 321—5 |

WILLIAM H. BEHA, JR., Primary Examiner

U.S. Cl. X.R.

318—257, 293; 321—13, 27